United States Patent
Koyamada (10) Patent No.: US 6,169,551 B1
(45) Date of Patent: Jan. 2, 2001

(54) METHOD AND APPARATUS FOR COMPUTING AND VISUALIZING VOLUME DATA VALUES

(75) Inventor: Koji Koyamada, Hadano (JP)

(73) Assignee: International Business Machines Corporation, Armonk, NY (US)

( * ) Notice: Under 35 U.S.C. 154(b), the term of this patent shall be extended for 0 days.

(21) Appl. No.: 08/874,136

(22) Filed: Jun. 13, 1997

(30) Foreign Application Priority Data

Jun. 14, 1996 (JP) .................................................. 8-154612

(51) Int. Cl.[7] ........................... G06T 17/00; G06T 15/40; G06T 15/00
(52) U.S. Cl. ........................ 345/424; 345/419; 345/421
(58) Field of Search ..................................... 345/424, 421, 345/423, 502, 505, 418, 419

(56) References Cited

U.S. PATENT DOCUMENTS

| | | | |
|---|---|---|---|
| 4,821,210 | * | 4/1989 | Rumbaugh .............................. 345/421 |
| 5,222,202 | * | 6/1993 | Koyamada et al. ................... 345/423 |
| 5,594,842 | * | 1/1997 | Kaufman et al. ..................... 345/424 |
| 5,742,293 | * | 4/1998 | Koyamada et al. ................... 345/421 |
| 5,760,781 | * | 6/1998 | Kaufman et al. ..................... 345/424 |
| 5,930,384 | * | 7/1999 | Guillemaud et al. ................. 382/154 |

* cited by examiner

*Primary Examiner*—Jeffery Brier
*Assistant Examiner*—Chante E. Harrison
(74) *Attorney, Agent, or Firm*—A. Bruce Clay; Felsman, Bradley, Vaden, Gunter & Dillon, LLP (57) ABSTRACT

According to the present invention, a method is provided for assigning or converting volume data values defined at the center of cells to volume data values at node points, considering the residuals. Volume data values at a plurality of node points are computed from a volume data value at a center of each of a plurality of cells which are composed of the plurality of node points, where the position and the ID of each node point are stored in a memory with relation to each corresponding node point, and the volume data value at each node point is computed so that a value determined by (a) weighting a residual value which is the difference between a cell-inside value at a point inside a cell and a volume data value at the center of the cell by a predetermined weighting function, where the cell-inside value is calculated by interpolating a volume data at each node point which composes the cell, and then (b) accumulating the weighted residual value over all regions of the cell for each of the plurality of cells and (c) summing up the accumulations, is set to zero.

5 Claims, 6 Drawing Sheets

| $i$ | $u_i$ | $v_i$ | $w_i$ |
|---|---|---|---|
| 0 | -1.0 | -1.0 | -1.0 |
| 1 | 1.0 | -1.0 | -1.0 |
| 2 | 1.0 | 1.0 | -1.0 |
| 3 | -1.0 | 1.0 | -1.0 |
| 4 | -1.0 | -1.0 | 1.0 |
| 5 | 1.0 | -1.0 | 1.0 |
| 6 | 1.0 | 1.0 | 1.0 |
| 7 | -1.0 | 1.0 | 1.0 |

TABLE 1

| CELL No. | BACKGROUND ART | EXAMPLE 1 | EXAMPLE 2 |
|---|---|---|---|
| 1 | 5.460e-01 | 2.125e-01 | 9.271e-05 |
| 2 | 3.031e-01 | 1.152e-01 | 2.050e-05 |
| 3 | -3.825e-02 | -4.189e-02 | -2.818e-05 |
| 4 | 3.031e-01 | 1.152e-01 | 2.004e-05 |
| 5 | 2.282e-01 | 1.165e-01 | 7.725e-05 |
| 6 | -4.535e-02 | -1.887e-02 | -1.076e-05 |
| 7 | -3.825e-02 | -4.189e-02 | -2.818e-05 |
| 8 | -4.535e-02 | -1.887e-02 | -1.100e-05 |
| 9 | -2.422e-01 | -1.206e-01 | -5.681e-05 |
| 10 | 3.031e-01 | 1.152e-01 | 2.026e-05 |
| 11 | 2.282e-01 | 1.165e-01 | 7.690e-05 |
| 12 | -4.535e-02 | -1.887e-02 | -1.171e-05 |
| 13 | 2.282e-01 | 1.165e-01 | 7.714e-05 |
| 14 | 1.906e-01 | 1.286e-01 | 8.777e-05 |
| 15 | -4.783e-02 | 4.322e-02 | 2.046e-05 |
| 16 | -4.535e-02 | -1.887e-02 | -1.124e-05 |
| 17 | -4.783e-02 | 4.322e-03 | 1.999e-05 |
| 18 | -2.307e-01 | -9.236e-02 | -3.302e-05 |
| 19 | -3.825e-02 | -4.189e-02 | -2.858e-05 |
| 20 | -4.535e-02 | -1.887e-02 | -1.141e-05 |
| 21 | -2.422e-01 | -1.206e-01 | -5.726e-05 |
| 22 | -4.535e-02 | -1.887e-02 | -1.135e-05 |
| 23 | -4.783e-02 | 4.322e-03 | 1.841e-05 |
| 24 | -2.307e-01 | -9.236e-02 | -3.372e-05 |
| 25 | -2.422e-01 | -1.206e-01 | -5.750e-05 |
| 26 | -2.307e-01 | -9.236e-02 | -3.324e-05 |
| 27 | -3.814e-01 | -1.715e-01 | -7.224e-05 |
| AVERAGE | 2.117e-06 | 2.420e-06 | 1.304e-06 |
| AVERAGE OF ABSOLUTE VALUES | 1.726e-01 | 7.772e-02 | 3.806e-05 |

TABLE 2

METHOD AND APPARATUS FOR COMPUTING AND VISUALIZING VOLUME DATA VALUES

BACKGROUND OF THE INVENTION

1. Technical Field

The present invention relates in general to data visualization processing, and in particular to a method for assigning or converting a volume data value which is defined at a cell center to volume data values at node points of the cell in such a manner that a residual value becomes as small as possible.

2. Description of the Related Art

Currently, it is presupposed by the majority of existing data visualization algorithms, that the volume data value is defined on each node point of a volume cell. For example, the Marching Cubes Algorithm by Lorensen and Cline examines each volume cell and determines, from the arrangement of nodal points with data values above or below a given threshold value, what the topology of an isosurface passing through the volume cell would be. See Lorensen, W., and Cline, H. E., "Marching Cubes: A High Resolution 3-D Surface Construction Algorithm," Computer Graphics, Vol. 21, No. 4, 1987. Mathematics of Computation, Vol. 38, No. 157, pp. 181–199. When calculating a streamline, vector data values are interpolated by using nodal data values within an element. See Haimes, R., Giles, M., and Darmofal, D., "Visual 3-D Software Environment for Flow Visualization," VKI Lecture Series on Computer Graphics and Flow Visualization on CFD, 1991.

However, some numerical simulation algorithms define their variables at the centers of the volume cells. In order to apply the visualization algorithms indicated above, currently the data at the centers of the volume cells have to be converted into data at the volume cell's node points by one of the following methods. That is, the Inverse-Weighted Method proposed by Shepard (see Franke, R., "Scattered Data Interpolation: Tests of Some Methods," Mathematics of Computation, Vol. 38, No. 157, pp. 181–199.) or an extrapolation technique (see Vankeirsbilck, P. and Decomink, H., "Higher Order Upwind Finite Volume Schemes with ENO-properties for General Unstructured Meshes," AGRAD Report 787, 1992).

In the former, the data value $S_i^{point}$ at the i-th node point is given by the following expression:

$$S_i^{point} = \frac{\sum_{c_i^{cell}} S^{cell} \times W^{cell}}{\sum_{c_i^{cell}} W^{cell}}$$ [Expression 9]

where, $S^{cell}$ means a data value at the center of the cell, $W^{cell}$ means an inverse value of a distance between the node point and the center of the cell, and $$\sum_{c_i^{cell}}$$

means a summation with respect to volume cells that share the node point i.

The latter technique is based on a gradient vector $\nabla S^{cell}$ estimated at the center of an element, and $S_i^{point}$ is given as follows:

$$S_i^{point} = S^{cell} + (\vec{D}, \nabla S^{cell})$$ [Expression 10]

where the parenthesis of the second item in the above expression means an inner product, and the vector D represents a vector from the center of a cell to a node point. In addition, $\nabla S^{cell}$ means a gradient of the scalar function $S^{cell}$. When extrapolating from the center of the cell to the node points, different values for each node will be generated from each of the volume cells that share that node point. The usual approach in this situation is to average the contribution from each volume cell to generate a single value.

In general, the data space spanned by the resulting data at the node points is different from one spanned by the original data at the center of the cell. The above techniques do not consider any residual due to the difference.

SUMMARY OF THE INVENTION

In view of the foregoing, it is therefore one object of the present invention to provide a method for assigning volume data values, defined at the center of the cells, to node points, considering the residuals.

It is another object of the present invention to provide a method for assigning volume data values defined at the center of the cells, to node points so that the following integral is made smaller.

$$\int_{V_k} \left( \sum_{i=0}^{n-1} S_i^{point} \times N_i(u, v, w) - S_k^{cell} \right) dv$$ [Expression 11]

where $N_i(u,v,w)$ is an interpolating function for a node point i, $S_k^{cell}$ is a volume data value at the center of the cell k, and the integral is performed over the whole cell k.

According to the present invention, a method is utilized for computing volume data values at a plurality of node points from volume data at each center of a plurality of cells which are composed of the plurality of node points, wherein the position and the ID of each node point are stored in a memory with relation to each of the corresponding node points. The volume data value at each node point is computed so that a value determined by (a) weighting a residual value which is the difference between a cell-inside value at a point inside a cell and a volume data value at the center of the cell by a predetermined weighting function, where the cell-inside value is calculated by interpolating a volume data value at each node point which composes the cell, and then (b) accumulating the weighted residual value over all regions of each of all the cells and (c) setting the sum of the accumulations to zero. By selecting an appropriate weighting function, an assignment in which the residual is small becomes possible.

According to another embodiment of the present invention, there is a method for computing volume data values at a plurality of node points from a volume data value at each center of a plurality of cells which are composed of the plurality of node points, wherein the position and the ID of each node point are stored in a memory with relation to each of the corresponding node points. $S_i^{point}$, which is a volume data value at a node point i which composes a cell k of a plurality of cells which share a node point j, is computed so that, with respect to all node points j, the expression, $$\sum_{C_j^{cell}} \left( \int_{V_k} M_j(u, v, w) R_k(u, v, w) dv \right) = 0 \quad \text{[Expression 12]}$$

is satisfied, where $C_j^{cell}$ means all cells which share the node point j, and $M_j(u,v,w)$ is a predetermined weighting function corresponding to the node point j, and $N_i(u,v,w)$ is a predetermined interpolating function at a point (u,v,w) inside the cell which corresponds to the node point i, and $S_k^{cell}$ is a volume data value at the center of the cell k, and a residual value $R_k(u,v,w)$ is the difference between $S_k^{cell}$ and the result of summing the product of $S_i^{point}$ and $N_i(u,v,w)$ with respect to all node points which compose the cell k.

According to still another embodiment of the present invention, there is a method for computing volume data values at a plurality of node points from a volume data value at each center of a plurality of cells which are composed of the plurality of node points and for visualizing the computed volume data values, wherein the position and the ID of each node point are stored in a memory with relation to each of the corresponding node points, the method including the steps of: computing $S_i^{point}$ which is a volume data value at a node point i which composes a cell k of a plurality of cells which share a node point j such that, with respect to all node points j, the expression, $$\sum_{C_j^{cell}} \left( \int_{V_k} M_j(u, v, w) R_k(u, v, w) dv \right) = 0 \quad \text{[Expression 13]}$$

is satisfied, where $C_j^{cell}$ means all cells which share the node point j, and $M_j(u,v,w)$ is a predetermined weighting function corresponding to the node point j, and $N_i(u,v,w)$ is a predetermined interpolating function at a point (u,v,w) inside the cell which corresponds to the node point i, and $S_k^{cell}$ is a volume data value at the center of the cell k, and a residual value $R_k(u,v,w)$ is the difference between $S_k^{cell}$ and the result of summing the product of $S_i^{point}$ and $N_i(u,v,w)$ with respect to all node points which compose the cell k; and performing a visualization process for the computed $S_i^{point}$ and displaying the result of the processing.

According to still another embodiment of the present invention, there is a method for computing volume data values at M node points from a volume data value at each center of a plurality of cells which are composed of said M node points and visualizing the computed volume data values, wherein the position and the ID of each node point are stored in a memory with relation to each of the corresponding node points, the method including the steps of: integrating the product of a predetermined interpolating function $N_i(u,v,w)$ which corresponds to a node point i included within the cell k of a plurality of cells which share a node point j and is evaluated at a point (u,v,w) inside the cell k and a predetermined weighting function $M_j(u,v,w)$ corresponding to said node point j over all regions of the cell k for each node point j, each cell k and each node point i which composes the cell k; integrating the product of the predetermined weighting function $M_j(u,v,w)$ corresponding to the node point j and a volume data value $S_k^{cell}$ at the center of the cell k over all regions of the cell k for each cell k, and summing each integrated value for each node point; summing integrated values computed in the first integrating step with respect to the same node point for each node point j, and storing the result of the summation as an element in the node point ID-th row and the j-th column in an M×M matrix; computing an inverse matrix of the M×M matrix, and multiplying the inverse matrix and an M×1 matrix whose element at the j-th column is the integrated and summed value for j, which is computed in the integrating and summing step; and performing the visualization process for a value of each element of an M×1 matrix generated by the multiplication which represents the volume data value at each node point, and displaying the result of the visualization process on a display.

An example of a preferred embodiment of the present invention would include a hexahedral cell, with a predetermined interpolating function:

$$N_i(u,v,w) = 0.125(1 + u_i \times u)(1 + v_i \times v)(1 + w_i \times w) \quad \text{[Expression 14]}$$

where $u_i$, $v_i$, and $w_i$ are values which depend on the node point i which composes a cell k.

Another feature of a preferred embodiment would be a predetermined weighting function comprising an interpolating function corresponding to the node point j such as:

$$M_j(u,v,w) = \max(N_j(u,v,w), ((1-u^2)(1-v^2)(1-w^2))^\alpha). \quad \text{[Expression 15]}$$

The above as well as additional objects, features and advantages of the present invention will become apparent in the following written detailed description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF AN ILLUSTRATIVE EMBODIMENT

Principle of the Invention

First, the principle of the present invention is explained. However, it is regarded as a pre-processing step to calculate a volume data value at the center of each cell, to establish for each node point, a cell node point ID (cell ID) for referencing node points within the specific cell in which they reside, and a region node point ID (region ID) whose referencing scope extends throughout a region including a plurality of cells, and to store for each node point within the region a cell ID, a region ID, and a node point position.

Figure 1:
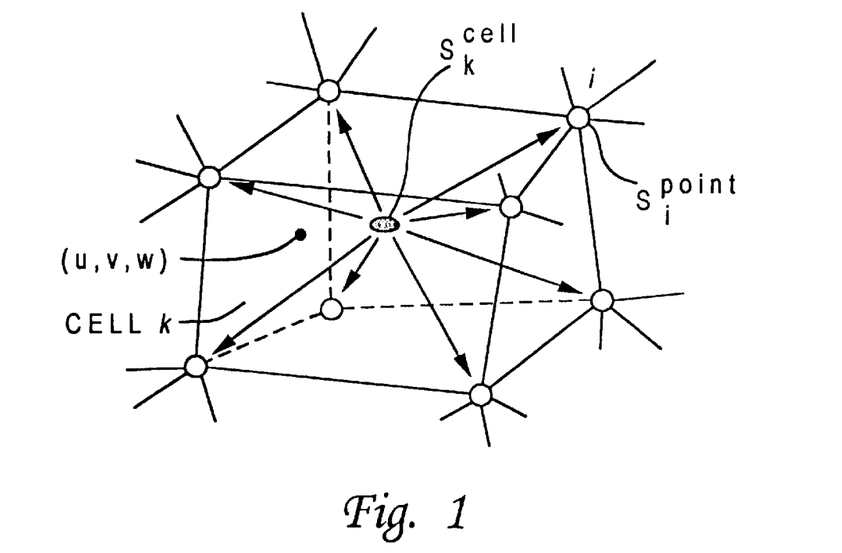
FIG. 1 depicts an example of a hexahedral cell.

First, as shown in FIG. 1, it is established that data at the i-th node point in a cell k is $S_i^{point}$. To calculate this value $S_i^{point}$ is one of the objects of the present invention. Data value S at a point (local coordinate (u,v,w)) inside the cell k is calculated as shown below. However, to simplify the explanation, it is assumed that S is a scalar data.

$$S = \sum_{i=1}^{n-1} S_i^{point} \times N_i(u, v, w) \qquad \text{[Expression 16]}$$

In Expression 16, n is the number of node points which compose the cell k, and $N_i(u,v,w)$ represents an interpolating function for the i-th node point. Note i is a number corresponding to a node point inside the cell k.

When the cell is hexahedral like in FIG. 1, the following three dimensional linear interpolating function is used as the interpolating function $N_i(u,v,w)$:

$$N_i(u,v,w)=0.125(1+u_i \times u)(1+v_i \times v)(1+w_i \times w) \qquad \text{[Expression 17]}$$

where this (u,v,w) is a local coordinate defined inside the hexahedral cell, each value varies from −1 to +1, and i is the number of the node point as described above. The values $(u_i,v_i,w_i)$ are shown in Table 1.

As shown in FIG. 1, a volume data value at the center of the cell k is $S_k^{cell}$ and a residual value at a point (u,v,w) inside the cell is as follows:

$$R_k(u, v, w) = \sum_{i=0}^{n-1} S_i^{point} \times N_i(u, v, w) - S_k^{cell} \qquad \text{[Expression 18]}$$

In this invention, an integral of a product of the residual and a weighting function which is defined for node points over the whole region of the studied object is set to zero. The following equation represents the relation:

$$\sum_{k=0}^{m-1} \left( \int_{V_k} M_j(u, v, w) R_k(u, v, w) dv \right) = 0 \qquad \text{[Expression 19]}$$

where j is an region ID number for the studied object, and $M_j(u,v,w)$ is a weighting function for the node point j and m is a total number of cells.

Figure 2:
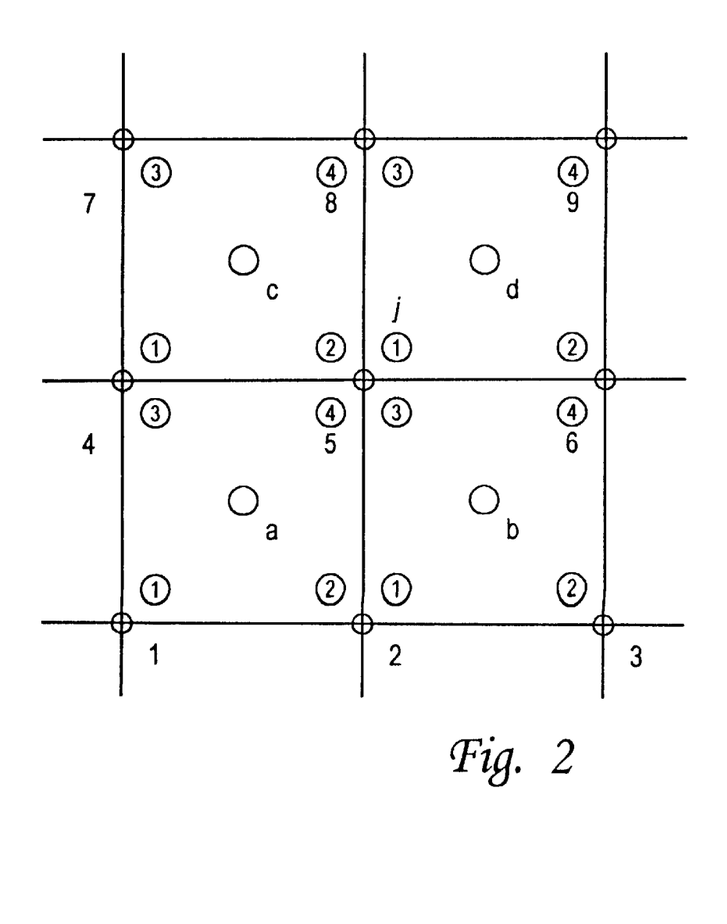
FIG. 2 depicts an example cell in two dimensions in order to simplify understanding of the process of the present invention.

To summarize the relationship between the node point j and the cell k and the node point i which is a node point ID specific to the cell k, FIG. 2 is shown. FIG. 2 is a two dimensional figure used to simplify the present invention's explanation. In the region described by FIG. 2, there are 9 node points and 4 cells. A region ID is assigned to each node point from 1 to 9, while cell IDs for each cell a to d are indicated in the numbers inside the circles as shown in FIG. 2. In addition, j is a node point which is shared by 4 cells a to d as shown in FIG. 2 and its region ID is 5. The cell ID for cell a of this node point j is 4, 3 in cell b, 2 in cell c, and 1 in cell d.

In Expression 19, first, an integral of the residual $R_k$ weighted by $M_j$ is performed over the entire region of the cell k, then the result of the integral is summed with respect to all cells (m cells). However, the weighting function for the node point j is normally set to 0 in cells which do not share the node point j. So that Expression 19 is modified to be as follows:

$$\sum_{C_j^{cell}} \left( \int_{V_k} M_j(u, v, w) R_k(u, v, w) dv \right) = 0 \qquad \text{[Expression 20]}$$

where $C_j^{cell}$ means all cells which share the node point j.

Then, when $R_k(u,v,w)$ described in Expression 18 is substituted into Expression 20, Expression 20 becomes the expression:

$$\sum_{C_j^{cell}} \left( \int_{V_k} M_j(u, v, w) \left( \sum_{i=0}^{n-1} S_i^{point} \times \right. \right. \qquad \text{[Expression 21]}$$

$$\left. \left. N_i(u, v, w) - S_k^{point} \right) dv \right) = 0$$

So, consider what function is used for $M_j(u,v,w)$ indicated in Expression 21. As the first example, it is considered that $M_j(u,v,w)=N_j(u,v,w)$. This example is shown as line a in FIG. 3. Actually $M_j(u,v,w)$ is a three dimensional function, but only one dimension (u) is shown. $N_j$ decreases straightly when u varies from −1 to +1. However, as shown previously, because a suffix attached to N indicates a cell ID and a suffix attached to M indicates a region ID, it is necessary to convert j to a cell ID. For example in FIG. 2, j=5 and the region node point ID that is 5 is the cell node point ID that is 4 in cell a, 3 in cell b, and 1 in cell d. It is necessary to change the function which is used, adapting to the cell of the object of the integral.

Figure 3:
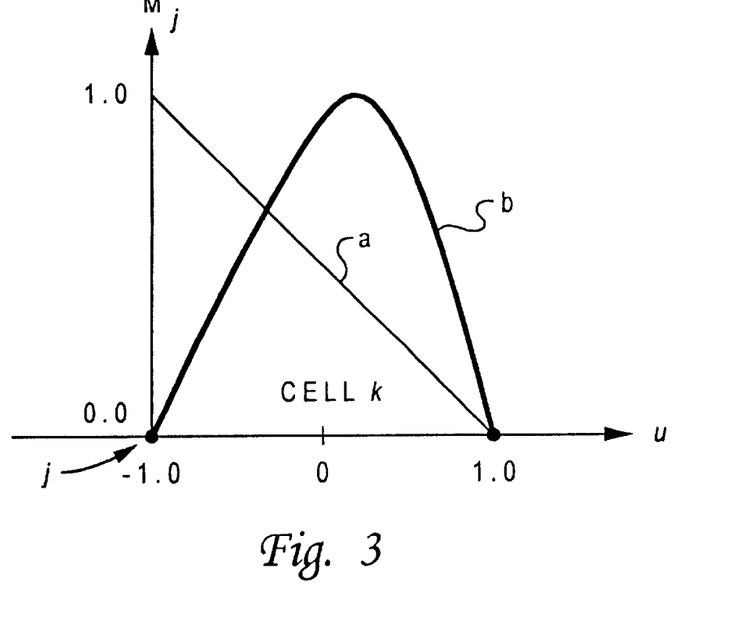
FIG. 3 illustrates a weighting function in one dimension.

As a second example, the following function is considered:

$$M_j(u,v,w)=\max(N_j, ((1-u^2)(1-v^2)(1-w^2))\alpha) \qquad \text{[Expression 22]}$$

where "max" means the maximum or larger of the two values. An example in one dimension of this function is shown as thick line b in FIG. 3. The line b decreases once, but this decrease is emphasized because of the representation in the figure. The decrease in the function is almost able to be neglected because the decreased value is small, relative to the overall function. The characteristic of Expression 22 is that the weight at the center of the cell (u=0) is greater than the rest of the cell, or at least greater than the weight given by the function $N_j$. That is, the value at the center of the cell which is calculated in the pre-processing step is taken seriously when calculating data values for node points throughout the cell.

When for each node point, the linear equation system in Expression 21 is solved, volume data at each node point is obtained. The principle of the invention explained above is originated from the weighted residual method in the finite element method, in which, to calculate the solution of a differential equation numerically, the original function is approximated, and a value calculated by integrating over all region of variables, using an error (residual) between the approximated function and the original function as a weighting function, is set to zero. However, in the finite element method, there is no description or suggestion for calculating data at the node point when data at the center of the cell is given. The weighted residual method in the finite element method is described in O. C. Zienkiewics and K. Morgan, "FINITE ELEMENT AND APPROXIMATION," A Willey-Interscience Publication John Wiley & Sons, 1983 and the like.

The Process of the Present Invention

Figure 4:
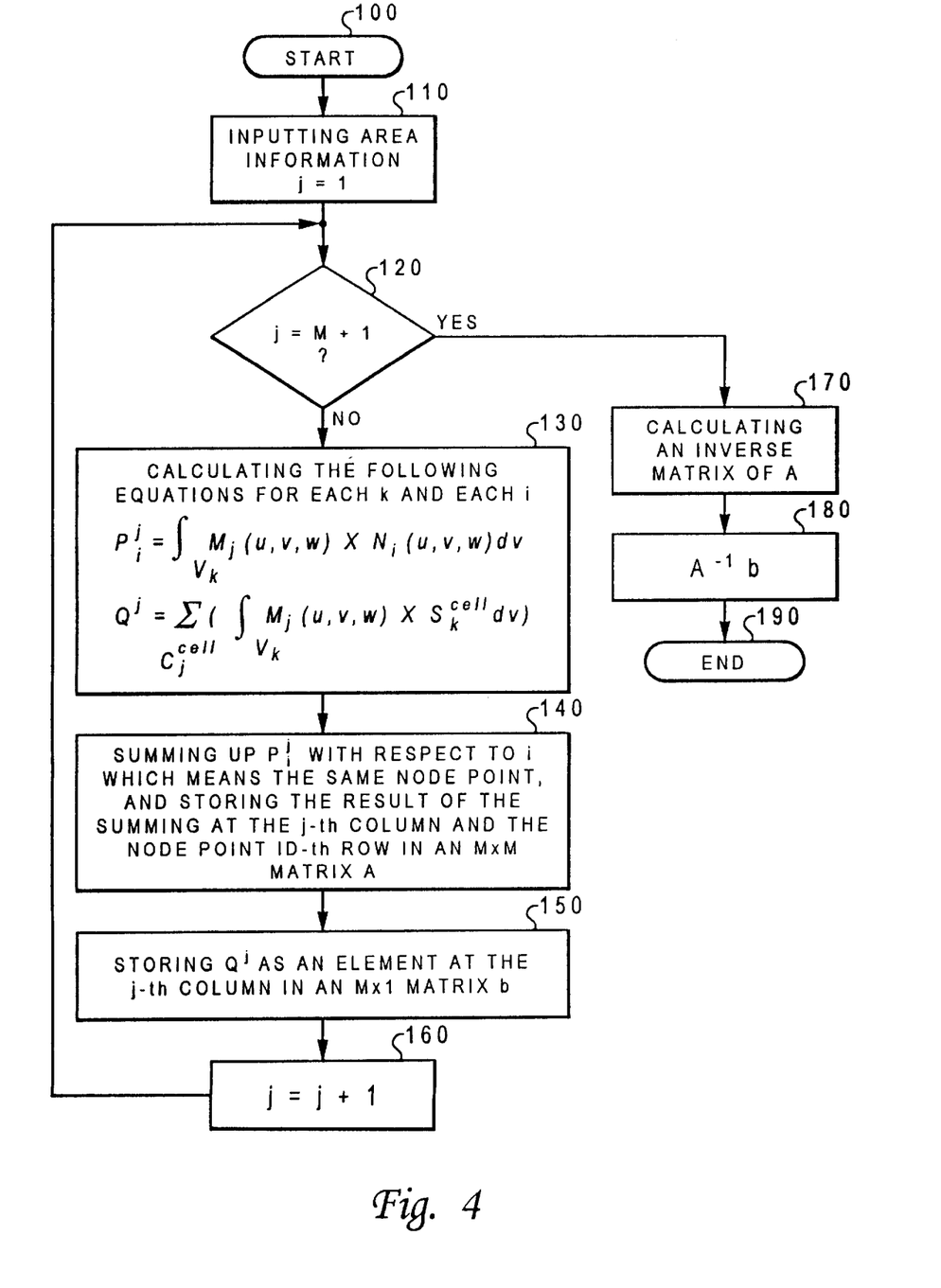
FIG. 4 is a flowchart illustrating a process of an embodiment of the present invention.

The explanation of performed process steps according to the principle of the present invention described above is given using FIG. 4. At step 100, the process starts. First, volume data at the center of each cell, a region ID and a cell ID for each node point, and area information which includes position information for each node point are input (step 110). In addition, index j is initialized (j=1). Then, to perform the following process with respect to all j's, it is determined whether j is equal to or more than M+1 which is more than M (the number of node points) (step 120). While j does not exceed M, the following calculations are performed for each k and i (step 130), $$P_i^j = \int_{V_k} M_j(u, v, w) \times N_i(u, v, w) dV \quad \text{[Expression 23]}$$

$$Q^j = \sum_{C_j^{cell}} \left( \int_{V_k} M_j(u, v, w) \times S_k^{cell} dv \right) \quad \text{[Expression 24]}$$

As described above, when an node point j is determined, a cell k which shares the node point j and a node point i which composes the cell k are determined. So, in Expression 23, an integral for each node point i is performed on every cell k. In Expression 24, a cell k is determined from the node point j, and an integral is performed on every k, and the integrals with respect to all k are summed up. Note that it is apparently thought that Expression 23 has a constant value because the Expression is an integral of a product of the predetermined functions, but the values of Expression 23 are different at the integrating because the forms of the cells are different. If the forms of all the cells are the same, the value of the Expression is the same.

The values of Expression 23 are summed up with respect to i which means the same node point, and the result of summing up is stored at the j-th column and the node point ID-th row in M×M matrix A (step 140). As described above, i is a cell ID. So even if i is different, there is a case where the region ID is the same. For example, the number 2 in a circle and the number 1 in a circle which are cell IDs is attached to the node point whose region ID is 2 in FIG. 2. Since the node point 2 (j=2) has cases where i=1 and i=2, values of Expression 23 in these cases are summed. Then, the value is stored at the j-th column and the second row in the matrix A. For each node point which composes a cell k which shares a node point j, a summed value or a value of Expression 23 is stored in the node point ID-th row and zero is stored in the other rows.

Furthermore, a value of Expression 24 is stored as an element at the j-th column in M×1 matrix b (step 150). Then, j is incremented by 1 (step 160) and the process returns to step 120.

After iterating through such a process, and performing steps 130 and 140 with respect to all j's, an inverse matrix $A^{-1}$ of the matrix A is calculated (step 170). This is a normal operation of the matrix. When $A^{-1}b$ (this is a normal multiplication of the matrices.) is calculated after that, volume data for each node point is stored at a column corresponding to the node point in the calculated M×1 matrix (step 180). The process then ends as depicted at step 190.

When volume data values for each node point have been calculated by decomposing an expression defined by Expression 21 as described above, those volume data values are applied to previously described visualization methods and a visualization process for the volume data values is performed. Since the visualization process is not the main theme of the present invention, the details are not described further. When the visualization process is performed, the result is output to an output device connected to a data processing system or computer, for example, a CRT, a LCD, which are display devices, or a printer device, whereby a user can visually understand the meaning of the volume data values.

It should be understood that the present invention is not limited to the preferred embodiment particularly shown and described above. It will be understood by those having ordinary skill in the art that the present invention may be practiced with modifications such as a modification of the order of the steps of the process described above or to the manner in which the process steps are performed. For example, when the matrix A is calculated, in the above description, it was stated that an element in the j-th column is summed up after all solutions of Expression 23 are calculated, but it is possible to calculate Expression 23 for elements to be summed up. In addition, the order of the calculation of Expression 23 and 24 is arbitrary, and the order of the creation of the matrix A and the matrix b is also arbitrary. It is not necessary to calculate from j=1 in sequence. The process of calculating the matrix A and the matrix b can be processed in parallel in a plurality of processors.

Additionally, in the above description, it is assumed that the volume data value is scalar data, but vector data may be substituted and the process for vector data is similar. Specifically, the above described process is performed for each element of the vector data. For example, in three dimensions, for three kinds of data, the above process is performed respectively.

Apparatus of the Invention

Figure 5:
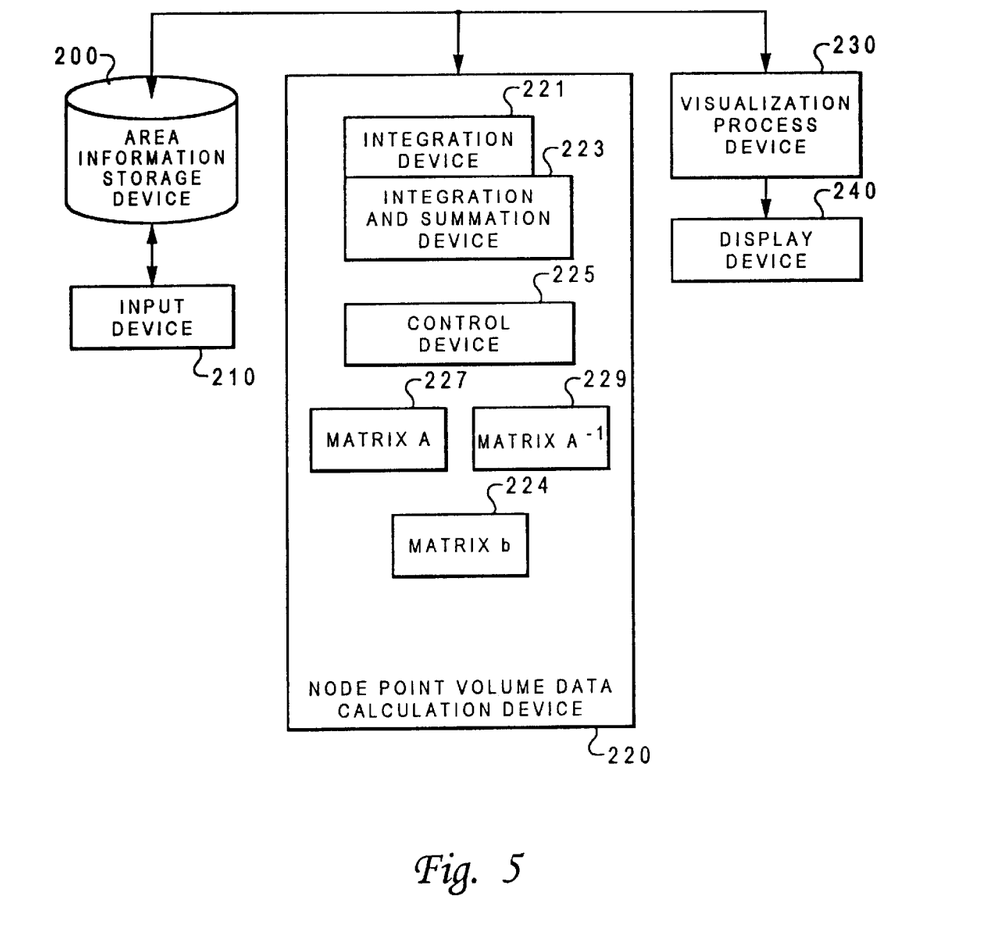
FIG. 5 shows a block diagram of an apparatus which may be utilized to implement the present invention.

An apparatus for performing the process of the present invention may be prepared as a form of a special apparatus, or may be implemented as a computer program or the like and executed utilizing a data processing system or computer. An example of a special apparatus is shown in FIG. 5. In this case, the apparatus is composed of an area information storage device 200, an input device 210, a node point volume data value calculation device 220, a visualization process device 230, and a display device 240. The node point volume data value calculation device 220 includes an integration device 221, an integration and summation device 223, a control device 225, a work area 227 for the matrix A, a work area 229 for the matrix $A^{-1}$, and a work area 224 for the matrix b.

As shown above, the area information includes a volume data value for the center of each cell, a region ID, a cell ID, and the position of each node point. This is input by the input device 210. Then, using the information stored in this area information storage device 200, the integration device 221 performs the calculation of Expression 23. Similarly, the integration and summation device 223 performs the calculation of Expression 24. The control device 225 updates i, j, and k which are necessary for the integration device 221 and the integration and summation device 223 and stores data from the integration device 221 into a predetermined location in the work area 227 for the matrix A and stores data from the integration and summation device 223 into a predetermined location in the work area 224 for the matrix b. The control device 225 also calculates the matrix $A^{-1}$ and stores the matrix $A^{-1}$ into the work area 229 for the matrix $A^{-1}$ when all elements in the matrix A are calculated. Finally, the control device 225 calculates $A^{-1}b$ and for example, stores the result into the area information storage 200, but may store into another device which is set up to store $A^{-1}b$. The volume data value at each node point, which is calculated like this, is visualized in the desired form by the visualization process device 230, and the result of the visualization process is presented to the user through the display device 240.

FIG. 5 is one embodiment, and the present invention is not limited to the embodiment depicted in FIG. 5. The display device may be substituted by another output device such as a printer. In addition, a device for performing a multiplication of matrices other than the control device 225 may be utilized.

The input device 210 may be a device like a keyboard or an apparatus, such as a floppy disk drive, in which the data is calculated in another device and carried in a medium read by the apparatus.

Figure 6:
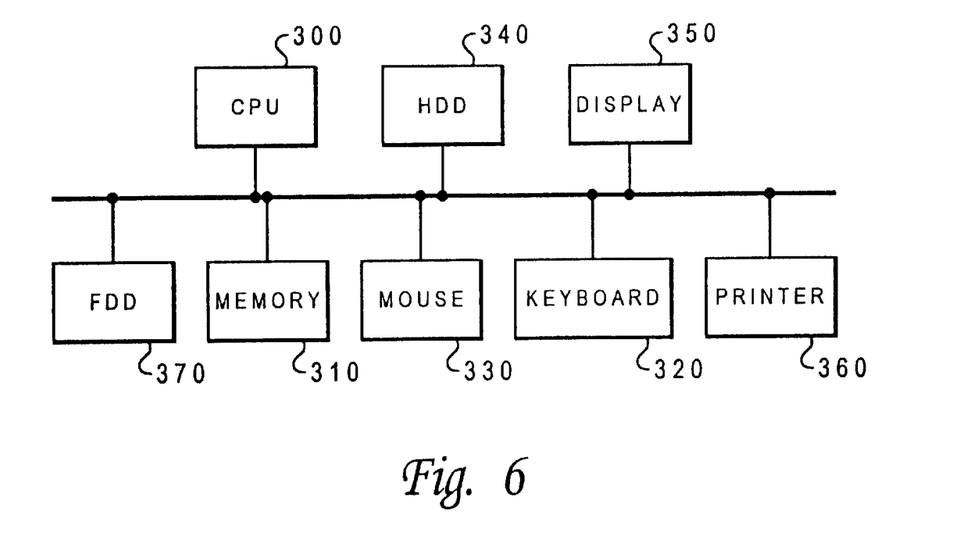
FIG. 6 is a block diagram which illustrates an example of a data processing system on which the present invention may be implemented.

Furthermore, an example of a typical data processing system with which the present invention could be implemented is shown in FIG. 6, the data processing system is an apparatus including a CPU 300, a memory 300, a hard disk drive (HDD) 340, a mouse 330, a keyboard 320, a display device 350, a printer device 360, and a floppy disk drive device 370 connected to a bus. The CPU 300 performs the processing shown in FIG. 4 using data and programs stored in the memory 310. The HDD 340 stores information including programs and data to be loaded into memory 310. It is possible to input the area information by keyboard 320 and/or mouse 330 or to input area information calculated by another computer and input from FDD 370. A program for performing the visualization process using the area information and data calculated by the present invention utilizing CPU 330 and memory 310 may be stored in HDD 340, and after data at each node point is calculated, the visualization program may be loaded into memory and executed. The results of the visualization program execution may be output to display device 350 and/or printer device 360.

This data processing system configuration is only one example, an alternative configuration might include a Magneto-Optical drive (MO drive) in place of FDD 370, a plurality of CPUs, or a cache memory.

It will be appreciated by those having ordinary skill in the art that a computer program could be created to perform the method of the present invention described above and stored into a storage medium, a storage apparatus, or a storage device for subsequent execution by a data processing system.

Advantages of the Invention

As described above, the present invention provides a method for assigning volume data values defined at the center of the cells to node points, considering the residuals.

More particularly, in an area which is composed of 27 hexahedral cells, the effect of the invention is shown based on the following expression:

$$\int_{V_k} \left( \sum_{i=0}^{7} S_i^{point} \times N_i(u, v, w) - S_k^{cell} \right) dv \qquad \text{[Expression 25]}$$

This is an integration of the residual in each cell over all regions of the cell. A comparison of the results of the method of the present invention in this embodiment against the results of previously implemented methods is illustrated in Table 2 of the drawings.

Thus, referring to a case calculated according to the method of the background art, a first example using the interpolating function as the weighting function described above, and a second example introducing a new function as the weighting function where α=0.6, based on the average of the absolute values, the values in the first example and the second example are significantly improved to the extent that the figure is different from the background art case. Especially in the second case, the present invention is shown to be an improvement over the previous methods. Thus, using data at the node point calculated by this invention, a volume data value which includes decreased residuals is calculated.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system for computing volume data values at M node points utilizing a volume data value at a center of each of a first plurality of cells, wherein said first plurality of cells includes said M node points, and each of said M node points includes a position and an identifier, said method comprising the steps of:

integrating a product of a predetermined interpolating function, $N_i(u,v,w)$, and a predetermined weighting function, $M_j(u,v,w)$, wherein said predetermined interpolating function is evaluated at a point (u,v,w) inside a cell k and which corresponds to a node point i included within said cell k, said cell k being included within a second plurality of cells sharing a node point j, and wherein said weighting function corresponds to said node point j within said second plurality of cells, for each node point j, each cell within said second plurality of cells and each node point i included within said cell k;

summing said integrated products of said predetermined interpolating function, $N_i(u,v,w)$, and said predetermined weighting function, $M_j(u,v,w)$, with respect to a same node point, for each node point j; and storing each of said summed, integrated products of said predetermined interpolating function, $N_i(u,v,w)$, and said predetermined weighting function, $M_j(u,v,w)$, as an element in a node point ID-th row and a j-th column of an M×M matrix;

integrating a product of said predetermined weighting function, $M_j(u,v,w)$, and a volume data value, $S_k^{cell}$, corresponding to a center of said cell k, for each of said second plurality of cells;

summing for each node point, each said integrated product of said predetermined weighting function, $M_j(u,v,w)$, and a volume data value, $S_k^{cell}$; and storing each of said summed, integrated products of said predetermined weighting function, $M_j(u,v,w)$, and a volume data value, $S_k^{cell}$, as an element at a j-th column of an M×1 matrix;

creating an inverse matrix of said M×M matrix; and multiplying said inverse matrix and said M×1 matrix such that said volume data values are computed;

performing a visualization process for a value of each element of an M×1 matrix generated by said multiplying step, said generated M×1 matrix representing a volume data value at each node point; and displaying a result of said visualization process utilizing said output device.

2. A data processing system for computing a volume data value at each of a plurality of node points utilizing a volume data value at a center of each of a first plurality of cells, wherein said first plurality of cells includes said plurality of node points, and each of said plurality of node points includes a position and an identifier, said data processing system comprising:

means for computing a volume data value, $S_i^{point}$, corresponding to a node point i, wherein said node point i is included within a hexahedral cell k, and said cell k is included within a second plurality of cells sharing a node point j such that, with respect to node point j, $$\sum_{C_j^{cell}} \left( \int_{V_k} M_j(u,v,w) R_k(u,v,w) dv \right) = 0 \quad \text{[Expression 1]}$$

is satisfied, wherein $C_j^{cell}$ denotes all cells which share said node point j, $M_j(u,v,w)$ is a predetermined weighting function corresponding to said node point j, $N_i(u,v,w)$ is a predetermined interpolating function evaluated at a point (u,v,w) inside said cell k and which corresponds to said node point i, where $$N_i(u,v,w) = 0.125(1+u_i \times u)(1+v_i \times v)(1+w_i \times w) \quad \text{[Expression 3]}$$

wherein $u_i$, $v_i$, and $w_i$ are values which depend on said node point i included within said hexahedral cell k, $S_k^{cell}$ is a volume data value at a center of said cell k, and a residual value $R_k(u,v,w)$ is a difference between $S_k^{cell}$ and a sum of a product of $S_i^{point}$ and $N_i(u,v,w)$ with respect to all node points included within said cell k; and means for performing a visualization process utilizing said computed volume data value, $S_i^{point}$; and means for displaying a result of said visualization process utilizing said output device.

3. The data processing system as set forth in claim 2, wherein said predetermined weighting function comprises an interpolating function corresponding to said node point j.

4. The data processing system as set forth in claim 2, wherein said predetermined weighting function comprises $$M_j(u,v,w) = \max(N_j(u,v,w), ((1-u^2)(1-v^2)(1-w^2))^\alpha). \quad \text{[Expression 4]}$$

5. A computer program product to be utilized within a data processing system for computing volume data values at M node points utilizing a volume data value at a center of each of a first plurality of cells, wherein said first plurality of cells includes said M node points, and each of said M node points includes a position and an identifier, said computer program product comprising:

media usable by said data processing system for storing and executing instruction means;

instruction means embodied within said media for integrating a product of a predetermined interpolating function, $N_i(u,v,w)$, and a predetermined weighting function, $M_j(u,v,w)$, wherein said predetermined interpolating function is evaluated at a point (u,v,w) inside a cell k and which corresponds to a node point i included within said cell k, said cell k being included within a second plurality of cells sharing a node point j, and wherein said weighting function corresponds to said node point j within said second plurality of cells, for each node point j, each cell within said second plurality of cells and each node point i included within said cell k;

instruction means embodied within said media for summing said integrated products of said predetermined interpolating function, $N_i(u,v,w)$, and said predetermined weighting function, $M_j(u,v,w)$, with respect to a same node point, for each node point j; and instruction means embodied within said media for storing each of said summed, integrated products of said predetermined interpolating function, $N_i(u,v,w)$, and said predetermined weighting function, $M_j(u,v,w)$, as an element in a node point ID-th row and a j-th column of an M×M matrix;

instruction means embodied within said media for integrating a product of said predetermined weighting function, $M_j(u,v,w)$, and a volume data value, $S_k^{cell}$, corresponding to a center of said cell k, for each of said second plurality of cells;

instruction means embodied within said media for summing for each node point, each said integrated product of said predetermined weighting function, $M_j(u,v,w)$, and a volume data value, $S_k^{cell}$; and instruction means embodied within said media for storing each of said summed, integrated products of said predetermined weighting function, $M_j(u,v,w)$, and a volume data value, $S_k^{cell}$, as an element at a j-th column of an M×1 matrix;

instruction means embodied within said media for creating an inverse matrix of said M×M matrix; and instruction means embodied within said media for multiplying said inverse matrix and said M×1 matrix such that said volume data values are computed;

instruction means embodied within said media for performing a visualization process for a value of each element of an M×1 matrix generated by said multiplying step, said generated M×1 matrix representing a volume data value at each node point; and instruction means embodied within said media for displaying a result of said visualization process utilizing said output device.

* * * * *